No. 732,861.

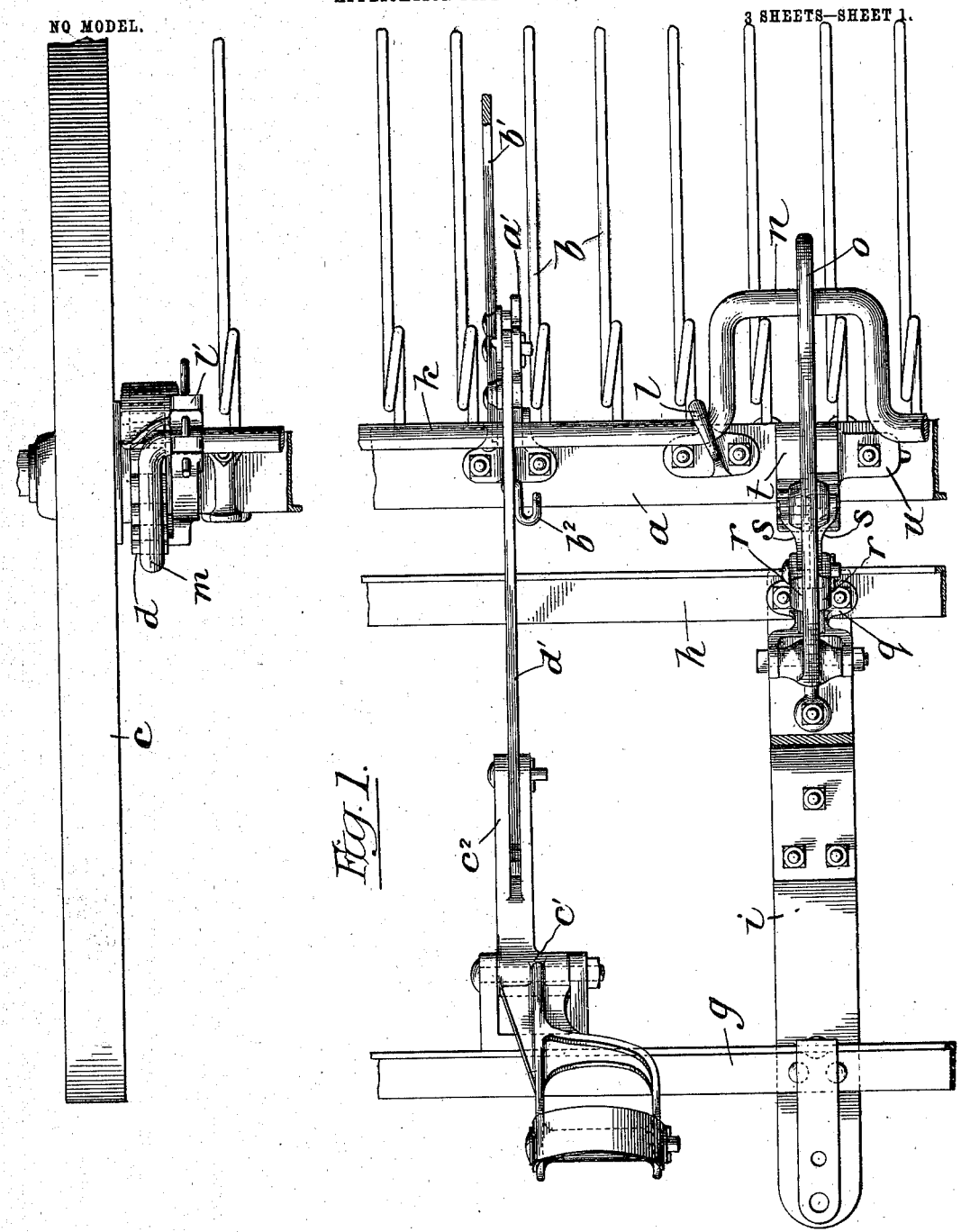

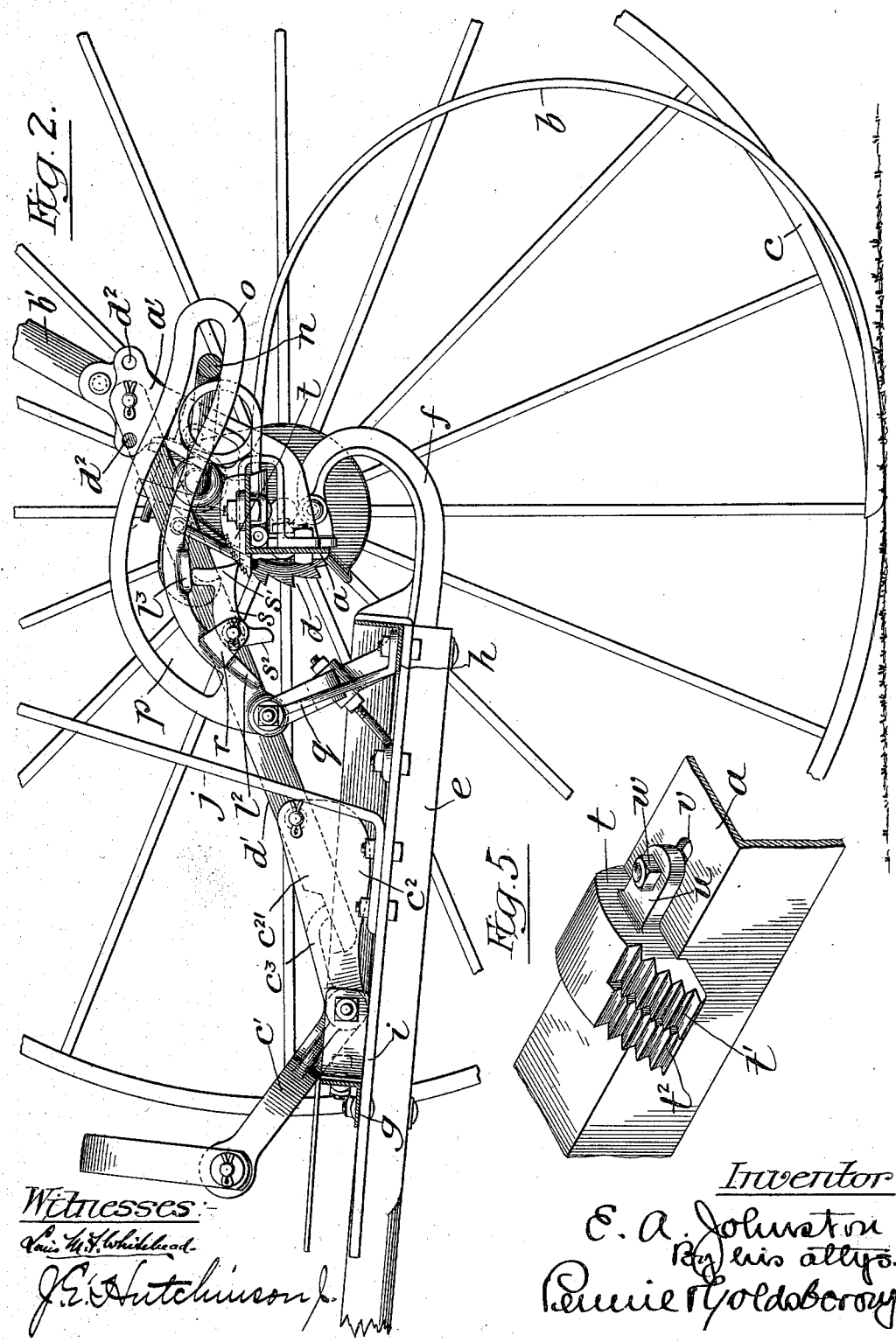

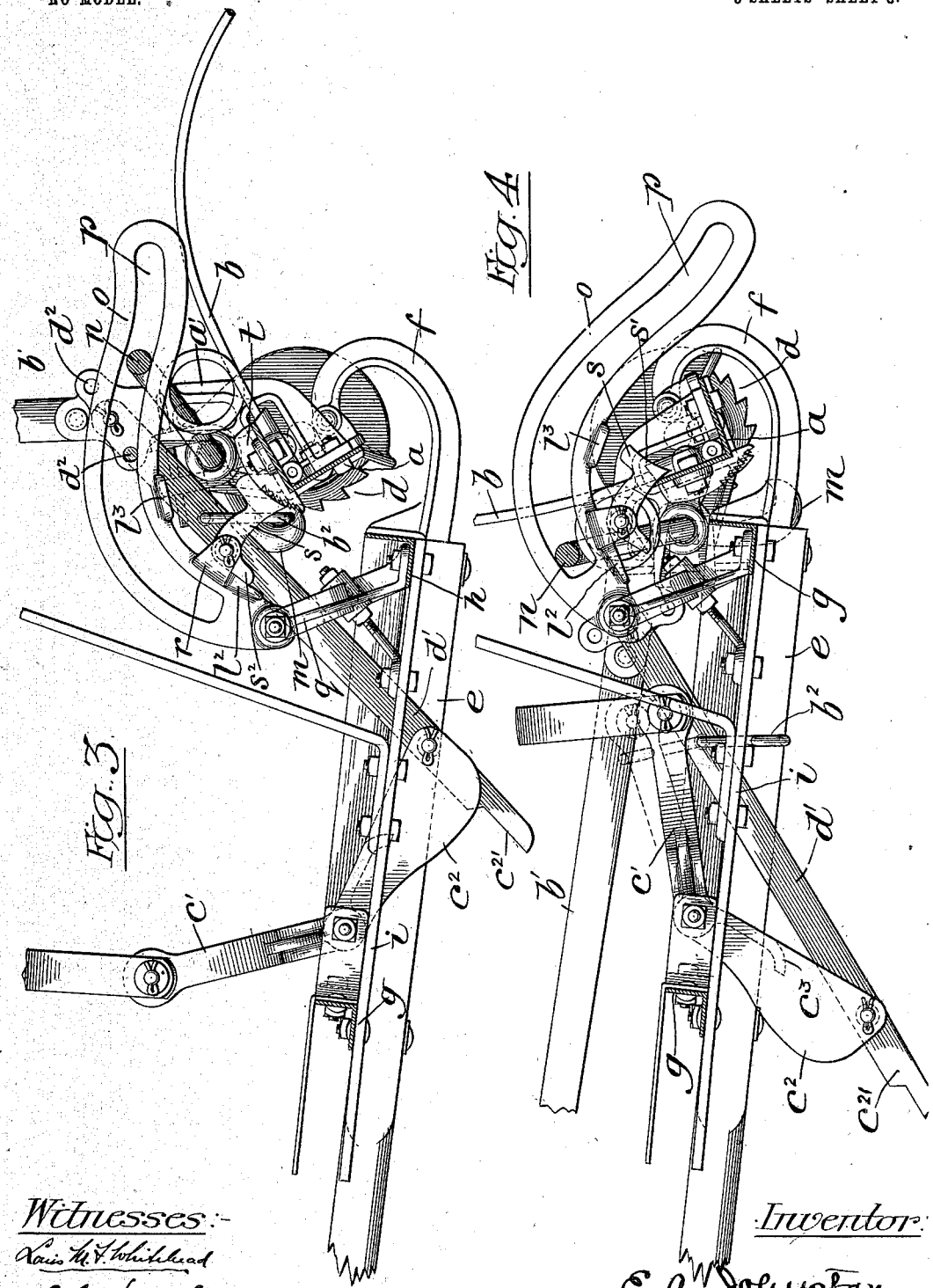

Patented July 7, 1903.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

AUTOMATIC PAWL-TRIP FOR HORSE HAY-RAKES.

SPECIFICATION forming part of Letters Patent No. 732,861, dated July 7, 1903.

Application filed November 1, 1902. Serial No. 129,705. (No model.)

*To all whom it may concern:*

Be it known that I, EDWARD A. JOHNSTON, a citizen of the United States, residing at Chicago, county of Cook, State of Illinois, have invented certain new and useful Improvements in Automatic Pawl-Trips for Horse Hay-Rakes; and I do hereby declare the following to be a full, clear, and exact description of the invention, such as will enable others skilled in the art to which it appertains to make and use the same.

The invention relates to that type of draft dumping horse hay-rakes where the rake-head carries a rock-shaft by means of which certain pawls are made to engage ratchets in the hubs of the wheels whenever it is desired to dump the load; and the invention consists in novel means for operating this shaft, so as to throw the pawls into engagement with the revolving ratchets and hold them there against danger of accidental and premature disengagement during practically the entire upward movement of the teeth.

The invention also comprises an arrangement of dumping-lever and connections with the rake-head whereby the parts may be locked and held with the teeth in their elevated or dumping position.

As in my application filed September 24, 1902, Serial No. 124,610, the natural tendency of the rake to dump itself is utilized to actuate the lever which trips the pawl-operating shaft, so as to cause the automatic dumping of the load by simply releasing the pressure of the driver's foot on the dumping-lever.

The invention is illustrated in the accompanying drawings, wherein—

Figure 1 is a plan view of part of a horse-rake embodying my invention. Fig. 2 is a vertical longitudinal section showing all the parts in their normal working position. Fig. 3 is a detail view similar to Fig. 2, showing the parts in the position they assume during the early part of their movement to dump the load. Fig. 4 is a similar detail showing the parts in the position they assume when the teeth have reached their highest position and, the load having been discharged, are about to return to their raking position. Fig. 5 is an enlarged detail perspective of the ratchet-block, showing its construction and the means for securing it to the rake-head.

Referring to the views, $a$ denotes the rake-head. It is here shown as made of angle-iron, as usual, and the teeth $b$ are secured to it in any preferred manner. One of the wheels is shown at $c$, and $d$ denotes the ratchet-wheel secured to its hub in the ordinary way.

$e$ indicates one of the thills, and $f$ the bracket by means of which it is connected to the rake-head.

$g$ and $h$ denote cross-sills of the rake-frame, and $i$ is a fore-and-aft bar which supports the driver's seat and its spring $j$.

The rake-head carries, as usual, the rock-shaft $k$ for operating the dumping-pawls. The shaft is journaled in bearings $l$ $l'$ on the head, and, as here shown, the pawls $m$ are formed integrally with the shaft by bending the end of the shaft at right angles and forming a hook thereon, as best shown in Figs. 2 and 3.

About centrally of its length the shaft $k$ has a cranked portion $n$, and the trip-lever $o$, which is curved, as shown in the drawings and in my other application above referred to, has a curved slot $p$ in it through which the cranked portion passes, so that whenever the lever is raised the shaft will be rocked so as to throw the pawls down into engagement with the ratchets on the wheels. The trip-lever is pivoted at its forward end to a bracket $q$, rising from the rake-frame, and extends upward and backward over the rake-head, and the curvature of the lever and its slot are conformed as nearly as possible to the path described by the cranked part of the shaft $k$ when the rake is dumping, so that the pawls will be held against accidental or other premature disengagement from their ratchets until the highest point in the elevation of the teeth has been reached, when the cranked part $n$ contacts with the front end of the slot in the lever and the shaft is rocked backward, lifting the pawls positively out of the teeth of the revolving ratchets.

As thus far described, there is no novelty claimed herein for the arrangement or construction of any of the parts above referred to, as the present invention relates exclusively to the means for actuating the pawl-tripping lever and the arrangement of the dumping lever, which permits the rake-head to be locked with the teeth in their elevated position, as will now be particularly described. Heretofore this pawl-tripping lever has been operated by various means, and in my application above referred to the means employed were themselves operated by the tendency which the accumulated hay has to rotate the rake-head in the same way it has to be rotated to dump the load. This operation is characteristic of the present improvement, and to this end there is freely pivoted in ears $r$, depending from the trip-lever near its pivot, a pair of pawls or triggers $s$, which extend horizontally rearward when the teeth are in position and engage the teeth of a ratchet-block that is secured to the head $a$ and projects toward the front, so that although the pawls $s$ do not reach quite to the head they are always above it, the ratchet-block being made to project forward, as shown in the drawings, so as to hold the pawls in this elevated position.

The ratchet-block may be secured to the rake-head in line with and under the trip-lever by any suitable means; but in order to insure the accurate alinement of the block with the pawls $s$ I preferably provide for laterally adjusting the block by connecting it to the head by means of such a bolt-and-slot connection—for example, as best shown in Fig. 5—where $u$ is an ear or lug projecting from one side of the block and $v$ is a slot in the head. A bolt $w$ passes through a perforation in the lug and slot and is tightened up, so as to firmly secure the block in any desired position, by an ordinary nut.

As clearly illustrated in Fig. 5, the block $t$ has two sets of ratchet-teeth $t'$ and $t^2$. These teeth face toward the front and in opposition to the direction of the point of the pawls, and the teeth in the set $t'$ are staggered or alternately arranged with those in the set $t^2$, so that one pawl engages one set of teeth and the other set is engaged by the other pawl. The object of this duplex arrangement of pawls and staggered teeth is merely to insure an immediate engagement of the rake-head with the means for operating the trip-lever, so that the pawl-operating shaft will be more promptly actuated when the pressure of the foot is taken off the dumping-lever than if only one pawl and set of ratchet-teeth were employed.

The ratchet-block is quadrant-shaped, as shown in all the figures, and the pawls $s$ are provided at their outer ends with faces $s'$, that are concaved on an arc that is substantially the same as that of the surface of the block. The pawls are also provided with heel projections $s^2$ near their pivots, and these projections contact with lugs $l^2$ on the trip-lever at a certain time to be hereinafter described, and the rear ends of the pawls bear upward against other lugs $l^3$ on the trip-lever, so that the pawls are in effect rigid projections for the time being first from one of the lugs and then from the other.

The construction of the tripping arrangement being as thus described, the operation is as follows: When the teeth are down and ready for raking, the normal positions of the head and the tripping-lever are as illustrated in Fig. 2. At this time the rear ends of the pawls $s$ rest on the ratchet-block, and the tripping-lever $o$ is held in its normal position by the engagement of the pawls with the lugs $l^3$. When the rake-head starts to rock forward, as it does as soon as the driver takes his foot off the dumping-lever, the teeth $t'$ and $t^2$ of the ratchet-block strike the point of the pawls and the trip-lever is carried up with the head. The rear end of the trip-lever of course travels faster than the point where the pawls $s$ are pivoted, and as the upward movement of the head continues the pawls soon separate from the lugs $l^3$ until their concave faces bear on the curved face of the block. At this time the heel $s^2$ of the pawls contacts with the lugs $l^2$ on the trip-lever in front of the pivot of the pawls, and the pawls then become rigid projections from this part of the lever. During the further movement of the head and up to the point of highest elevation of the teeth there is no additional elevation of the trip-lever, the concaved face of the pawls simply riding over the convexed face of the ratchet-block, and these faces being substantially concentric with the axis on which the head turns; but when the teeth reach the dumping position (see Fig. 4) the block passes from beneath the face of the pawls, and the trip-lever being thus deprived of its support its weight causes it to fall down, as shown in Fig. 4. Just after the pawls pass off the rear end of the ratchet-block the cranked portion of the shaft $n$ strikes the front end of the slot in the trip-lever and rocks the shaft $n$ backward far enough to release the dumping-pawls, and the weight of the trip-lever serves to hold the pawls free from the ratchets until the rake is again ready to be dumped. The rake-head is provided, as usual, with an upstanding bracket $a'$, to which a lever $b'$ is secured, by means of which the rake may be dumped by hand. A foot-lever $c'$, hereinafter called the "hold-down" or "dumping lever," is also pivoted to the rake-frame within reach of the driver's foot, and this lever is connected to the bracket $a'$ by means of a link $d'$, so that the dumping of the rake may be controlled by the driver with his foot and the teeth held down in working position without particular effort and without leaving his seat. This foot-lever is bell-crank shaped, as shown in all the figures, and its work-arm $c^2$ is pivotally connected to the link $d'$ at a point somewhat in rear of its front end, so as to leave a portion $c^{21}$ of the lever in front of the pivot to engage a stop $c^3$ on the lever and form a toggle-lock to hold the rake-teeth down when the link $d'$ is straightened out and its pivotal points come nearly in line with one another. The upper end of the bracket $a'$ is provided with a series of holes $d^2$, into any one of which the rear end of the link may be fastened, so as to adjust the length of the connection between the head and the dumping-lever.

As will be understood from all the figures, the dumping-lever is a bell-crank, with its work-arm $c^2$ extending normally rearward and swinging downward through the rake-frame from the position indicated in Fig. 2 to that denoted in Fig. 4 and back again. The power-arm $c'$ of the lever is arranged at such an angle (here shown as obtuse) to the work-arm that when the rake-teeth are at their highest elevation the pivotal points between the link and the lever and post $a'$ will be so nearly in line that the teeth will be readily held in their dumping position without the exercise of particular effort, and in order that the parts may be continuously held in this position there is provided on the link $d'$ a hook $b^2$, which is freely pivoted to it and hangs down in position to catch and hold the power-arm of the foot-lever when it is drawn back into the position shown in Fig. 4. This arrangement, therefore, adds to the machine the capacity to have the rake-teeth locked in their dumping position, which will be found to be a great advantage, especially when going from one field to another.

It is to be particularly noted in respect of the automatic dumping arrangement above described that not only is the natural tendency to dump quickly imparted to the trip-lever, but that after the rocking movement of the head has begun it is impossible for the lever to return to its normal position until the dumping operation is completed. The dumping-pawls are thus positively held in engagement with the revolving ratchets until the proper time to release them, and their accidental and premature release is thus effectively provided against.

Having thus described my invention, what I claim is—

1. In a wheeled hay-rake, the combination of the rake-head, the revolving ratchet-wheels, the dumping-pawls, the pawl-operating shaft, the trip-lever, and means whereby the natural tendency of the rake to dump itself will impart to the lever a sufficient movement to operate the pawls, said means consisting of a pawl pivoted to the lever, and ratchet-teeth on the rake-head which engage the lever-pawl.

2. In a wheeled hay-rake, the combination of the rake-head, the revolving ratchet-wheels, the dumping-pawls, the pawl-operating shaft, the trip-lever, a pair of pawls pivoted to the lever, and two sets of ratchet-teeth on the rake-head in position to engage the pawls, the teeth of the sets being alternately arranged with respect to each other.

3. In a wheeled hay-rake, the combination of the rake-head, the revolving ratchet-wheels, the dumping-pawls, the pawl-operating shaft, the trip-lever, a pawl pivoted to the lever and having a concave face at its free end, and a ratchet-block secured to the head and having a convex upper surface on which the face of the pawl rides.

4. In a wheeled hay-rake, the combination of the rake-head, the revolving ratchet-wheels, the dumping-pawls, the pawl-operating shaft, the trip-lever, a pawl pivoted to the lever and having a heel projection at its inner end, a lug on the lever in position to be engaged by the heel of the pawl, and a block on the rake-head having ratchet-teeth to be engaged by the pawl.

5. In a wheeled hay-rake, the combination of the rake-head, the revolving ratchet-wheels, the dumping-pawls, the pawl-operating shaft, the trip-lever, a pawl pivoted on the lever, a lug on the lever in position to be engaged by the free end of the pawl, and a block on the rake-head having ratchet-teeth to be engaged by the pawl.

6. In a wheeled hay-rake, the combination of the rake-head, the revolving ratchet-wheels, the dumping-pawls, the pawl-operating shaft, the trip-lever, a pawl pivoted to the lever and having a toe or point and a concave face at its outer end, and a block on the rake-head having ratchet-teeth to be engaged by the toe of the pawl, and a convex surface in rear of the teeth for the concave face of the pawl to slide on.

7. In a wheeled hay-rake, the combination of the rake-head, the revolving ratchet-wheels, the dumping-pawls, the pawl-operating shaft, the trip-lever, and means whereby the natural tendency of the rake to dump itself will impart to the lever a sufficient movement to operate the pawls, said means consisting of a pawl pivoted to the lever in position to be engaged by the head when it starts to rock and which holds the lever in elevated position until the dumping position of the teeth is reached.

8. In a wheeled hay-rake, the combination of the rake-head, the revolving ratchet-wheels, the dumping-pawls, the pawl-operating shaft, the trip-lever, and means whereby the natural tendency of the rake to dump itself will impart to the lever a sufficient movement to operate the pawls, said means consisting of a pawl pivoted to the lever in position to be engaged by the head when it starts to rock, and which during the initial movement of the head raises the lever and throws the dumping-pawls into action, and during the remainder of the head's movement simply holds the trip-lever against falling till the dumping position of the teeth has been reached, the pawl being disengaged and the lever thereby allowed to fall when the rake has been dumped.

9. In a hay-rake, the combination with the head, of a pivoted bell-crank dumping-lever, a link connecting the work-arm of the lever with the head, and a hook or stop on the link to receive the power-arm of the lever when the rake is in dumping position, whereby the head may be locked with the rake-teeth in elevated position.

In testimony whereof I affix my signature in presence of two witnesses.

EDWARD A. JOHNSTON.

Witnesses:
CHAS. N. CHAMBERS,
W. M. TWOMBLY.